(12) United States Patent
Nishi

(10) Patent No.: US 9,866,854 B2
(45) Date of Patent: Jan. 9, 2018

(54) APPARATUS FOR UPDATING SIDE INFORMATION ON MOTION VIDEO DATA BY DIFFERENT RULES BETWEEN DC AND AC COMPONENTS

(75) Inventor: Takashi Nishi, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 546 days.

(21) Appl. No.: 13/304,539

(22) Filed: Nov. 25, 2011

(65) Prior Publication Data

US 2012/0134411 A1    May 31, 2012

(30) Foreign Application Priority Data

Nov. 26, 2010  (JP) ................................ 2010-264011

(51) Int. Cl.
  *H04N 7/32*    (2006.01)
  *H04N 19/30*   (2014.01)
  *H04N 19/46*   (2014.01)
  *H04N 19/136*  (2014.01)
  *H04N 19/184*  (2014.01)
  *H04N 19/44*   (2014.01)

(52) U.S. Cl.
  CPC ......... *H04N 19/395* (2014.11); *H04N 19/136* (2014.11); *H04N 19/184* (2014.11); *H04N 19/44* (2014.11); *H04N 19/46* (2014.11)

(58) Field of Classification Search
  CPC .......................... H04N 19/00466; H04N 19/46
  USPC .............. 382/232; 370/392; 375/240, 240.03
  See application file for complete search history.

(56) References Cited

U.S. PATENT DOCUMENTS

| | | | | |
|---|---|---|---|---|
| 6,337,879 B1 * | 1/2002 | Mihara | ................ | H04N 19/159 375/240 |
| 2006/0210177 A1 * | 9/2006 | Murai | ................. | H04N 19/176 382/232 |
| 2007/0121632 A1 * | 5/2007 | Zabarski | ...................... | 370/392 |
| 2009/0238270 A1 * | 9/2009 | Nishi | .................... | H03M 7/30 375/240.12 |

(Continued)

FOREIGN PATENT DOCUMENTS

JP    2009-232066 A    10/2009

OTHER PUBLICATIONS

Anne Aaron et al., "Transform-domain Wyner-Ziv Codec for Video", Proc. SPIE Visual Communications and Image Processing, San Jose, CA (2004).

(Continued)

*Primary Examiner* — Dave Czekaj
*Assistant Examiner* — Berteau Joisil
(74) *Attorney, Agent, or Firm* — Rabin & Berdo, P.C.

(57) ABSTRACT

In a data updating apparatus for updating first data having plural bits according to a predetermined data format, a detector detects a domain point at which the first data are different from second data including plural bits decoded by Slepian-Wolf decoding according to the predetermined data format. The first data is used for decoding encoded data on a non-key frame separated from a stream of frames by Slepian-Wolf decoding and transformed from a predictive frame associated with the non-key frame and generated from information on a key frame. A data updater updates a less significant bit in the first data than the domain point supplied from the detector according to a predetermined updating scheme.

14 Claims, 7 Drawing Sheets

(56) References Cited

U.S. PATENT DOCUMENTS

| | | | | |
|---|---|---|---|---|
| 2009/0245372 A1* | 10/2009 | Yamasaki | .............. | H04N 19/44 375/240.15 |
| 2010/0208801 A1* | 8/2010 | Yamasaki | ............ | H04N 19/172 375/240.12 |
| 2010/0226431 A1* | 9/2010 | Yamasaki | .............. | H04N 19/30 375/240.12 |

OTHER PUBLICATIONS

A.B.B. Adikari et al., "A Sequential Motion Compensation Refinement Technique for Distributed video coding of Wyner-Ziv frames", 2006 IEEE International Conference on Image Processing (ICIP 2006), USA, Oct. 8-11, 2006, pp. 597-600.

* cited by examiner

APPARATUS FOR UPDATING SIDE INFORMATION ON MOTION VIDEO DATA BY DIFFERENT RULES BETWEEN DC AND AC COMPONENTS

BACKGROUND OF THE INVENTION

Field of the Invention

The present invention relates to a data updater, and more specifically to a motion video decoder, particularly using distributed video coding (DVC) technologies.

Description of the Background Art

In recent years, the distributed video coding (DVC) technologies have come to attention as a relatively newer coding scheme, as taught by, for example, Anne Aaron et al., "Transform-domain Wyner-Ziv Codec for Video," Proc. SPIE Visual Communications and Image Processing, San Jose, Calif. (2004).

The DVC scheme is a motion video coding system in which, in a sequence of motion video frames, video frames are intraframe-encoded every several frames while, with respect to the remaining, or possibly entire frames, only error correction code for signals representing errors predicted on the time axis is encoded for transmission. Video frames under intraframe-encoding may be referred to as key frames, and the interval between key frames may not be constant. The remaining frames, i.e. non-key frames, may be referred to as Wyner-Ziv (WZ) frames.

The currently predominant DVC scheme is based on two important theorems, Slepian-Wolf and Wyner-Ziv theorems, in the field of information theory. In the DVC scheme, a Wyner-Ziv frame encoder processes Slepian-Wolf encoding on Wyner-Ziv frames of original motion video to be encoded to transmit resultant, encoded data, and a Wyner-Ziv frame decoder produces predictive frames with respect to the original video and uses the predictive frames together with the transmitted, encoded data to perform Slepian-Wolf decoding to reproduce the original motion video.

In the DVC scheme as described in Aaron et al., key frames are encoded and decoded in a conventional manner. Hence, description will be focused on encoding and decoding WZ frames.

As may be understood from FIG. 1 of Aaron et al., in the Wyner-Ziv frame encoder, WZ frames to be encoded are transformed into a transform coefficient domain, i.e. frequency domain, by a discrete cosine transform (DCT). The transformed data are then quantized for each component in the frequency domain by a $2^{Mk}$ level quantizer. The quantized values $q_k$ are converted into bit string code, which will in turn be subjected to Slepian-Wolf encoding by a turbo encoder, for example, on a video frame-by-frame basis, i.e. an extract bit plane-by-plane basis. The resultant, encoded data contain parity bits, which will be temporarily stored in a buffer whereas the remaining bits will be discarded. This procedure on the bits is not explicitly illustrated in FIG. 1 of Aaron et al.

The Wyner-Ziv frame decoder produces predictive video frames by interpolation/extrapolation. The predictive frames are then DCT-transformed into a transform coefficient domain. The coefficients obtained by transforming are delivered as side information for respective components in the frequency domain to a Slepian-Wolf decoder, i.e. turbo decoder.

The Slepian-Wolf decoder requests the Wyner-Ziv frame encoder to transmit some of the parity bits temporarily stored. The Slepian-Wolf decoder then uses the transmitted parity bits as well as the side information to perform Slepian-Wolf decoding. If the decoding does not work adequately, the Slepian-Wolf decoder requests the Wyner-Ziv frame encoder again to additionally transmit some of the parity bits and then executes Slepian-Wolf decoding by means of the latest transmitted parity bits and the side information. This procedure is carried on until the decoding is satisfactory.

The decoded values, obtained by the Slepian-Wolf decoding, and the side information are used to reconstruct transform coefficients, which will then be inverse-transformed, or inverse DCT (IDCT)-transformed, to thereby obtain decoded video frames.

As stated in Aaron et al., it is known that, in the DVC scheme, the compression ratio is significantly influenced by how accurately the decoder produces predictive frames, or side information. The accurate generation of the side information would allow the compression ratio to be improved.

For that purpose, an attempt is proposed that the side information is updated as described in A. B. B. Adikari et al., "A Sequential Motion Compensation Refinement Technique for Distributed video coding of Wyner-Ziv frames," ICIP 2006, USA (2006). In the solution described in Adikari et al., each time a decoder has decoded a bit plane, it reproduces a predictive frame by motion detection and compensation. Then, this newly produced side information is used to decode a next bit plane.

In the solution described in Adikari et al., side information, or motion video data on a predictive frame, is thus reproduced and updated, thereby allowing side information to be generated with higher accuracy. This can improve the accuracy of information bits on each bit plane so as to improve the compression ratio. It is, however, anticipated that motion detection and compensation have to be performed on each bit plane to be processed, thereby significantly increasing the amount of processing. The motion detection and compensation need extremely complicated calculation. Therefore, if a motion video decoder is implemented mainly by software, the number of steps for processing would significantly be increased. On the contrary, if a motion video decoder is implemented mainly by hardware, the decoder would be large in scale and complicated.

SUMMARY OF THE INVENTION

It is therefore an object of the present invention to provide a data updater and a motion video decoder in which a reduced amount of processing is required for decoding motion video.

In accordance with the present invention, a data updating apparatus for updating first data, including a plurality of bits according to a predetermined data format, includes a detector for detecting a domain point at which the first data are different from second data including a plurality of bits decoded by Slepian-Wolf decoding according to the predetermined data format, the first data being used for decoding encoded data on a non-key frame separated from a stream of frames by the Slepian-Wolf decoding and transformed from a predictive frame associated with the non-key frame and generated from information on a key frame, and a data updater for updating a less significant bit in the first data than the domain point supplied from the detector according to a predetermined updating scheme.

Also in accordance with the present invention, a motion video decoder includes a key frame decoder for decoding encoded data on a key frame separated from a stream of frames, a transformer for producing from information on the key frame a predictive frame associated with a non-key frame separated from the stream of frames, and then transforming the predictive frame into first data including a plurality of bits according to a predetermined data format, a Slepian-Wolf decoder using the first data to decode encoded data on the non-key frame by Slepian-Wolf decoding, and an updating apparatus for updating the first data to supply the Slepian-Wolf decoder with updated data. The updating apparatus includes a detector for detecting a domain point at which the first data are different from second data including a plurality of bits decoded by the Slepian-Wolf decoding according to the predetermined data format, and a data updater for updating a less significant bit in the first data than the domain point supplied from the detector according to a predetermined updating scheme.

In accordance with the subject invention, a motion video delivery system includes a motion video encoder for encoding motion video into encoded data, and a motion video decoder connected with the motion video encoder for decoding the encoded data. The motion video decoder includes a key frame decoder for decoding encoded data on a key frame separated from a stream of frames, a transformer for producing from information on the key frame a predictive frame associated with a non-key frame separated from the stream of frames, and then transforming the predictive frame into first data including a plurality of bits according to a predetermined data format, a Slepian-Wolf decoder using the first data to decode the encoded data on the non-key frame by Slepian-Wolf decoding, and an updating apparatus for updating the first data to supply the Slepian-Wolf decoder with updated data. The updating apparatus includes a detector for detecting a domain point at which the first data are different from second data including a plurality of bits decoded by the Slepian-Wolf decoding according to the predetermined data format, and a data updater for updating a less significant bit in the first data than the domain point supplied from the detector according to a predetermined updating scheme.

In accordance with the present invention, the amount of processing required for decoding motion video can be reduced.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Now, a preferred embodiment of a motion video delivery system according to the present invention will be described in detail with reference to the accompanying drawings. The motion video delivery system of the illustrative embodiment may employ the above-described distributed video coding (DVC) as its motion video coding scheme.

Figure 1:
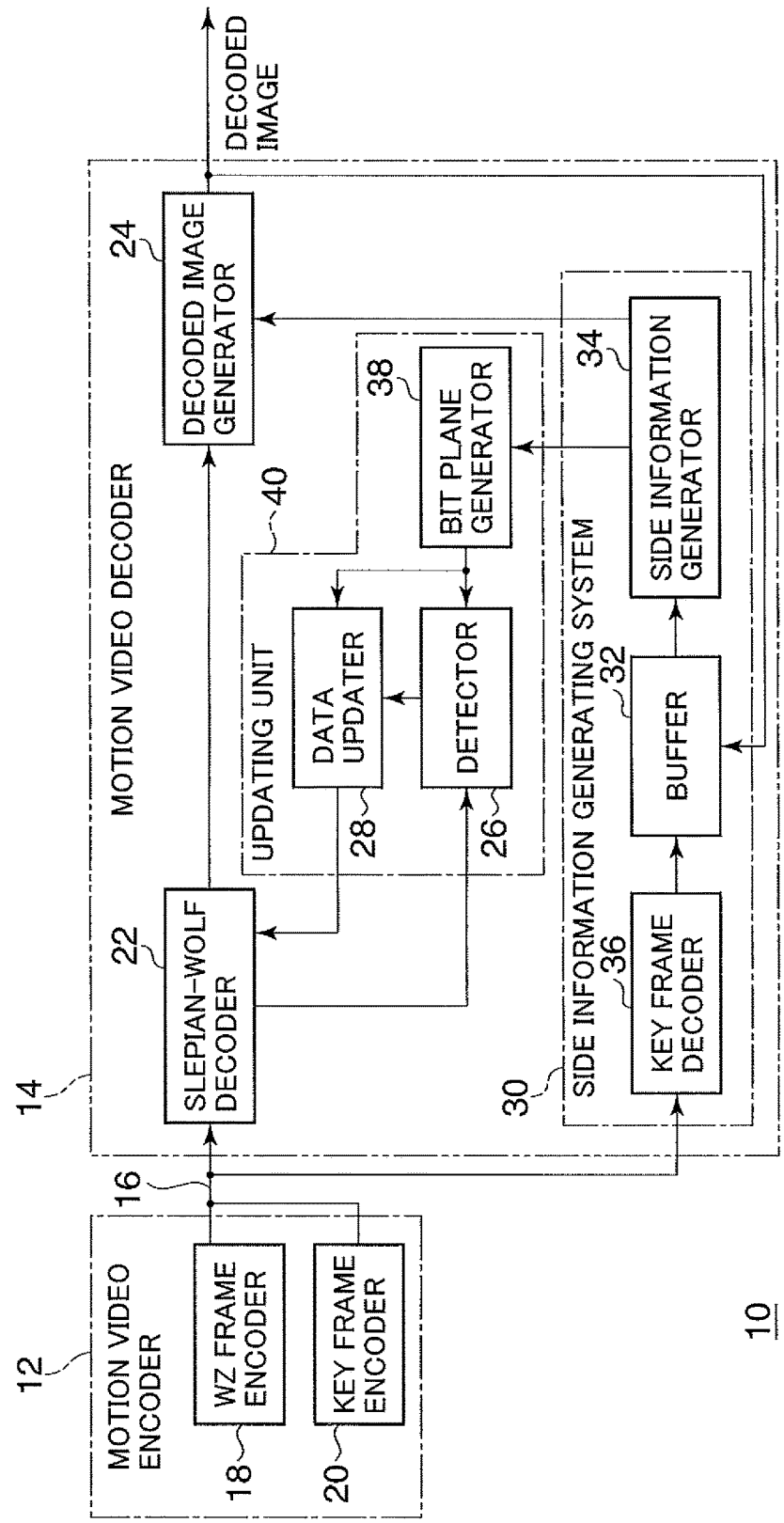
FIG. 1 is a schematic block diagram showing the configuration of a motion video delivery system in accordance with a preferred embodiment of the subject invention.

FIG. 1 is a schematic block diagram showing the configuration of a motion video delivery system 10 in accordance with the illustrative embodiment. The motion video delivery system 10 generally includes a motion video encoder 12 and a motion video decoder 14. The motion video decoder 14 is connected or connectable with the motion video encoder 12 via a telecommunications channel 16, which may be part of a telecommunications network, such as the Internet.

First, the configuration of the motion video encoder 12 will be described. The encoder 12 serves as encoding motion video frames supplied thereto, and has a Wyner-Ziv (WZ) frame encoder 18 adapted for encoding WZ frames and a key frame encoder 20 adapted for encoding key frames.

The motion video encoder 12 in the instant embodiment may be implemented by hardware having a variety of circuits interconnected, or may alternatively or additionally be implemented by a general-purpose processor system having a central processor unit (CPU), a read-only memory (ROM), a random access memory (RAM) and the like arranged to have program sequences installed and run to accomplish motion video encoding. In either case, the functional configuration of the motion video encoder 12 can be depicted as shown in FIG. 1. In this connection, the word "circuit" or "unit" may be understood not only as hardware, such as an electronics circuit, but also as a function that may be implemented by software installed and executed on a computer.

In a preliminary stage, not shown, of the motion video encoder 12, motion video frames supplied thereto are classified into WZ frames and key frames. On one hand, the key frames are encoded by the key frame encoder 20 with an intraframe coding scheme into data, such as intra-coded frames (I-frames) according to the Moving Picture Experts Group (MPEG) or frames according to the Joint Photographic Experts Group (JPEG). The encoded key frame data are transmitted to a decoding circuit, such as the motion video decoder 14. To the key frame encoder 20, an encoding process described in Aaron et al., for example, can be applied.

On the other hand, the WZ frames are encoded by the WZ frame encoder 18. The resultant, encoded WZ frame data will be transmitted to the motion video decoder 14.

The WZ frame encoder 18 in the instant embodiment may be adapted to encode the WZ frames almost similarly to the encoding described in Aaron et al., except for converting quantized values, into which transform coefficients transformed from the WZ frames into a frequency domain are quantized for each component in the frequency domain, to bit string code of a predetermined format according to a mapping table, which will be described later on. In the regard, this embodiment can also be implemented in the case where the quantized values are not converted into bit string code.

The WZ frame encoder 18 uses the bit string code to process Slepian-Wolf encoding. As described below, when the motion video decoder 14 decodes data encoded by the encoder 18, the bit string code of the format described above is extracted.

The framework of DVC scheme involves encoders encoding WZ frames, for example, in a pixel domain or in a transform coefficient, i.e. frequency, domain resultant from transform, such as DCT. In the instant illustrative embodiment, the motion video encoder 12 may be adapted for encoding in the transform coefficient domain, like Aaron et al., described earlier.

Next, description will be made on the configuration of the motion video decoder 14, connected with the motion video encoder 12 via the telecommunications channel 16. The motion video decoder 14 in the present embodiment may also be implemented as hardware, or alternatively or additionally be implemented by a processor system, like the motion video encoder, so as to accomplish motion video decoding functions. In such cases, the functional configuration of the motion video decoder 14 can be depicted as shown in FIG. 1.

The motion video decoder 14 may be adapted for decoding motion video data which are encoded by the DVC scheme and received from the motion video encoder 12.

The motion video decoder 14 has a Slepian-Wolf decoder 22, which is connected or connectable with the WZ frame encoder 18. The Slepian-Wolf decoder 22 processes Slepian-Wolf decoding on the encoded data from the WZ frames included in motion video data inputted from the motion video encoder 12 to the motion video decoder 14. For Slepian-Wolf decoding by the Slepian-Wolf decoder 22, for example, the existent maximum a posteriori probability (MAP) decoding for use in decoding turbo code is available.

The Slepian-Wolf decoder 22 has its one output connected with an input of a decoded image generator 24, which is adapted for producing motion video images decoded from the WZ frames. The decoder 22 has its other output connected to an input of a detector 26, which is adapted for detecting a prediction error point of side information on each bit plane. The Slepian-Wolf decoder 22 supplies the decoding results of the WZ frames to the decoded image generator 24 and the detector 26.

The Slepian-Wolf decoder 22 has its input connected with an output of a data updater 28, which is adapted for updating information bits on each bit plane. The Slepian-Wolf decoder 22 can use data supplied from the data updater 28 for the decoding.

The motion video decoder 14 has a key frame decoder 30, which is connected or connectable with the key frame encoder 20. The key frame decoder 30 functions as decoding data on the key frames included in motion video data inputted from the motion video encoder 12 to the motion video decoder 14. As described above, the key frames are encoded into data, such as I-frames of MPEG or JPEG frames, with a predetermined intraframe coding scheme. The key frame decoder 30 thus decodes the data in a manner appropriate to the coding scheme applied.

The key frame decoder 30 is connected with a buffer 32. The key frame decoder 30 supplies the decoded data of the key frames to the buffer 32 for storage.

The buffer 32 can store not only the decoding results of the key frame decoder 30 but also data of decoded video images supplied from the decoded image generator 24.

The buffer 32 has its output connected with an input of a side information generator 34, which is adapted for producing predictive frames corresponding to WZ frames.

Specifically, the side information generator 34 may be adapted to use decoded key frame/frames preceding or/and following a WZ frame to be predicted, respectively, to produce a predictive frame corresponding to that WZ frame. It is dependent upon the system design to use which or both of the key frames in order to produce a predictive frame associated with a WZ frame.

The side information generator 34 thus produces predictive frames corresponding to WZ frames, and then transforms the produced predictive frames into the transform coefficient domain, i.e. frequency domain.

In the illustrative embodiment, the key frame decoder 30, the buffer 32 and the side information generator 34 form a side information generating system 36 for generating side information from data of key frames.

The side information generator 34 has its output connected with a bit plane generator 38, as described later. The side information generator 34 is further adapted to quantize the data on predicted frames thus transformed on a component-by-component basis in the frequency domain to supply the quantized values to the bit plane generator 38.

The side information generator 34 has its other output connected with the decoded image generator 24 to supply the decoded image generator 24 with the decoding results of the key frames stored in the buffer 32.

The bit plane generator 38 serves to convert the quantized values, that is, side information data obtained by transforming the predictive frames into the transform coefficient domain, to bit string code of the predetermined format. The bit plane generator 38 then assorts the bits of the bit string code into bit planes according to the bit positions thereof.

The bit plane generator 38 includes an output connected with an input of the data updater 28 and supplies the obtained bit planes to the data updater 28.

The bit plane generator 38 has its other output connected with an input of the detector 26 to supply the obtained bit planes to the detector 26.

The detector 26 serves to detect or specify a prediction error point in the side information on the supplied bit planes. As will be apparent later or, the prediction error point is actually a frequency component associated a prediction error. In that context, such a prediction error point may more generally be referred to as a domain point. The detector 26 has its output connected with an input of the data updater 28 to feed the results from detecting a prediction error point to the date updater 28.

The data updater 28 serves as using the results of from detecting a prediction error point supplied from the detector 26 to update information bits on the bit planes supplied from the bit plane generator 38. Then, the data updater 28 delivers the updated bit planes to the Slepian-Wolf decoder 22 in the form of side information.

The detector 26, the data updater 28 and the bit plane generator 38 constitute an updating unit 40 for updating data, containing a plurality of bits according to a predetermined data format, to supply the data to the Slepian-Wolf decoder 22. The updating unit 40 thus updates side information generated by the side information generator 34.

The updating unit 40 in the present embodiment may also be implemented as hardware, or alternatively or additionally be implemented by a processor system, like the motion video encoder, so as to accomplish bit plane updating functions. In such cases, the functional configuration of the updating unit 40 can be depicted as shown in FIG. 1.

The decoded image generator 24, which is connected with the Slepian-Wolf decoder 22, uses the decoding results supplied from the Slepian-Wolf decoder 22 to produce decoded video images of WZ frames by means of, for example, inverse DCT transform (IDCT).

Furthermore, the decoded image generator 24, which is also connected with the side information generator 34, uses the decoding results of the key frames stored in the buffer 32 and supplied through the side information generator 34 to produce decoded video images of key frames.

The decoded image generator 24 may have its output connected with an input of an output apparatus, such as a display unit, not shown, and output the decoded motion video images of WZ frames and key frames on the output apparatus in a visible form of motion video. In an application where the key frame decoder 30 produces image data of the same format as produced by the decoded image generator 24 and stores the data in the buffer 32, the decoded image generator 24 may be adapted to output the data readout from the buffer 32 without modification.

The output format of the decoded video images by the decoded image generator 24 may not be restrictive. Motion video data formats for use in displaying decoded video images, such as, MPEG format, may be applied. Video signal formats, such as RGB raw data or even composite signals, compatible with visual display devices are also applicable.

The decoded image generator 24 has its output connected with the buffer 32 to supply data on the decoded video images of WZ frames to the buffer 32 to store the data in the latter.

Next, the operation of the motion video decoder 14 in the motion video delivery system 10 of the present illustrative embodiment will be described. The description of the operation of the motion video encoder 12 will not be repeated. Description of the operation of the motion video decoder 14 will start after having received the data of key frames and WZ frames encoded by the motion video encoder 12.

In the preceding stage to the motion video decoder 14, original motion video data are encoded and divided into data of key frames and WZ frames. The encoded data of the key frames and the WZ frames are transmitted to and will be decoded by the motion video decoder 14.

Figure 2:
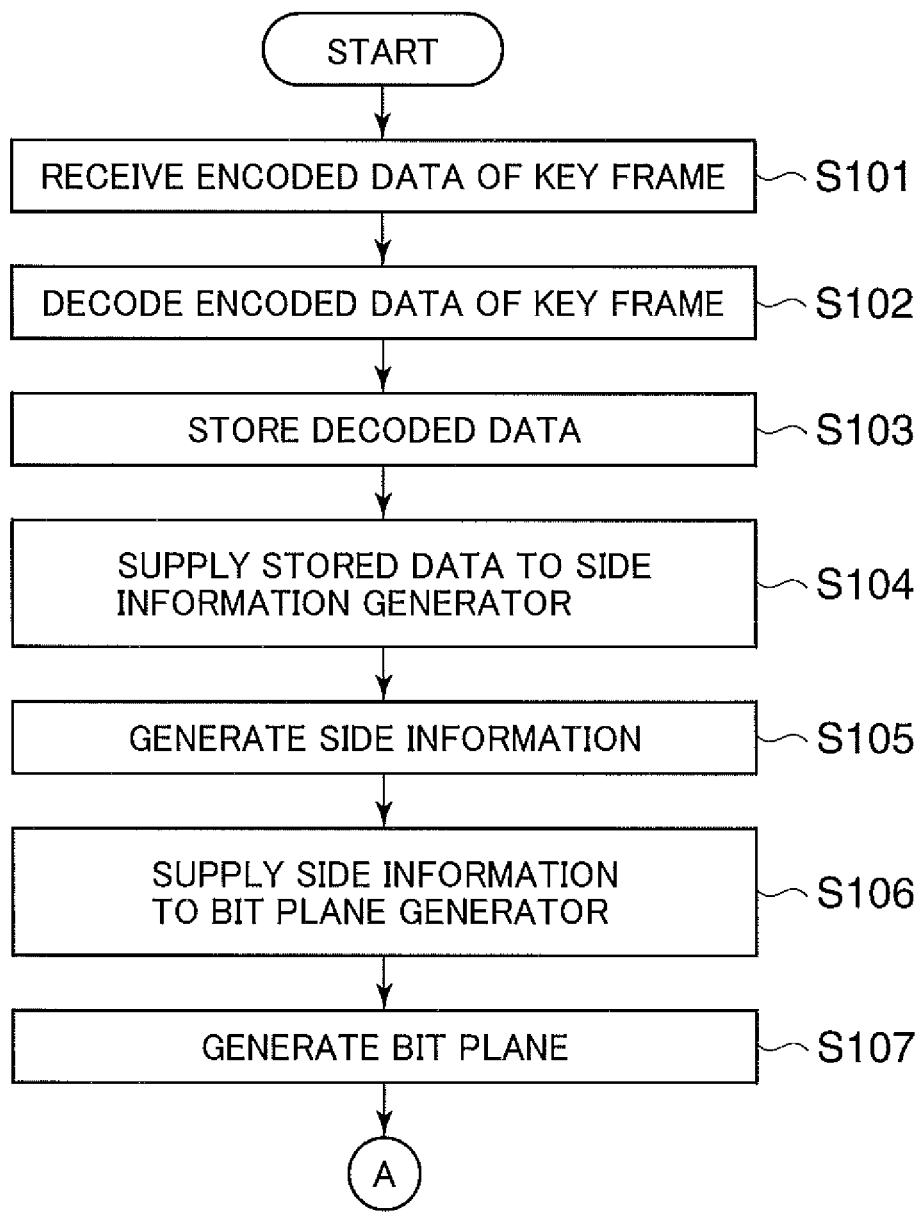
FIGS. 2, 3 and 4 are a series of flowcharts useful for understanding a procedure in a motion video decoder in the embodiment shown in FIG. 1.
Figure 3:
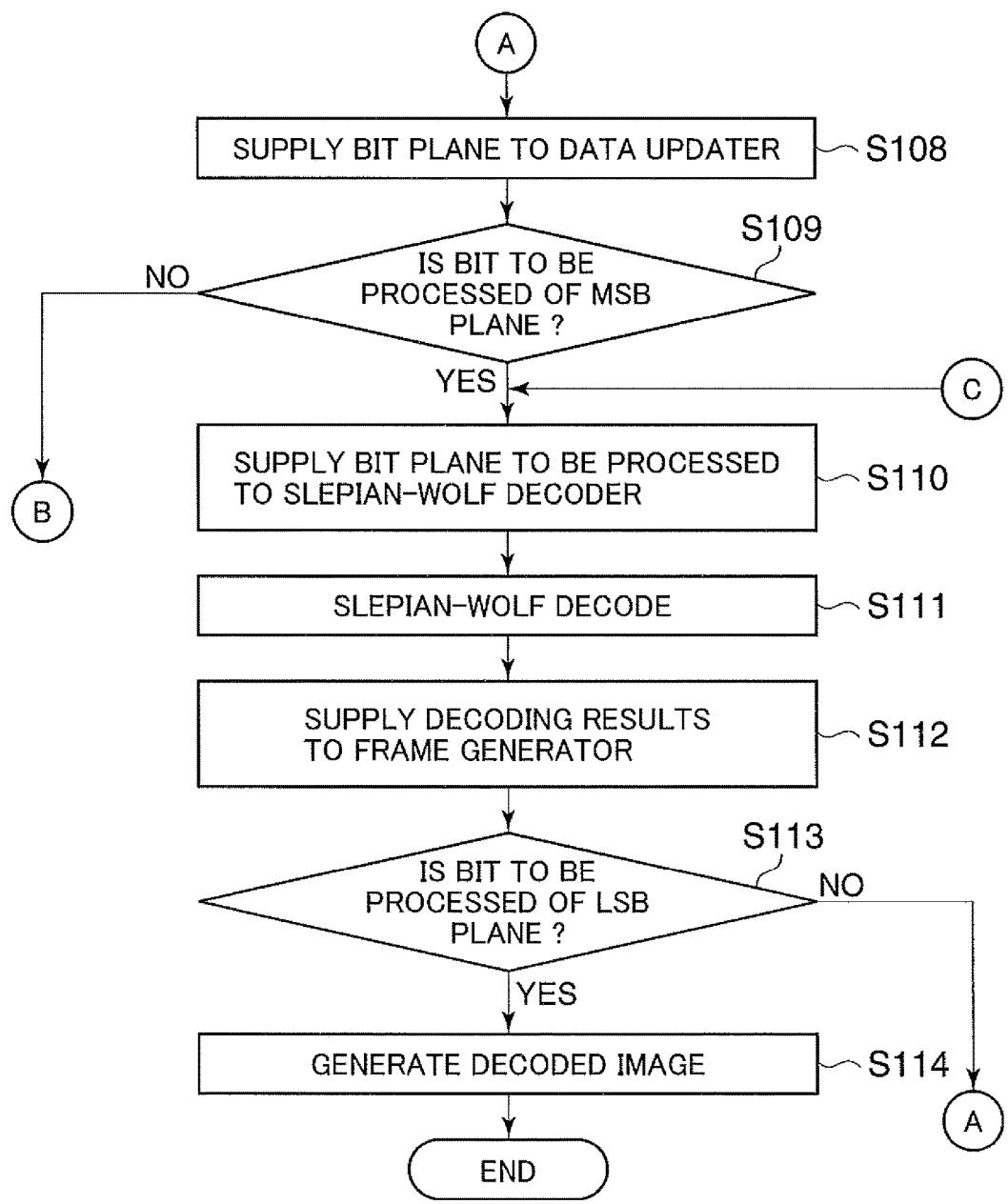
Figure 4:
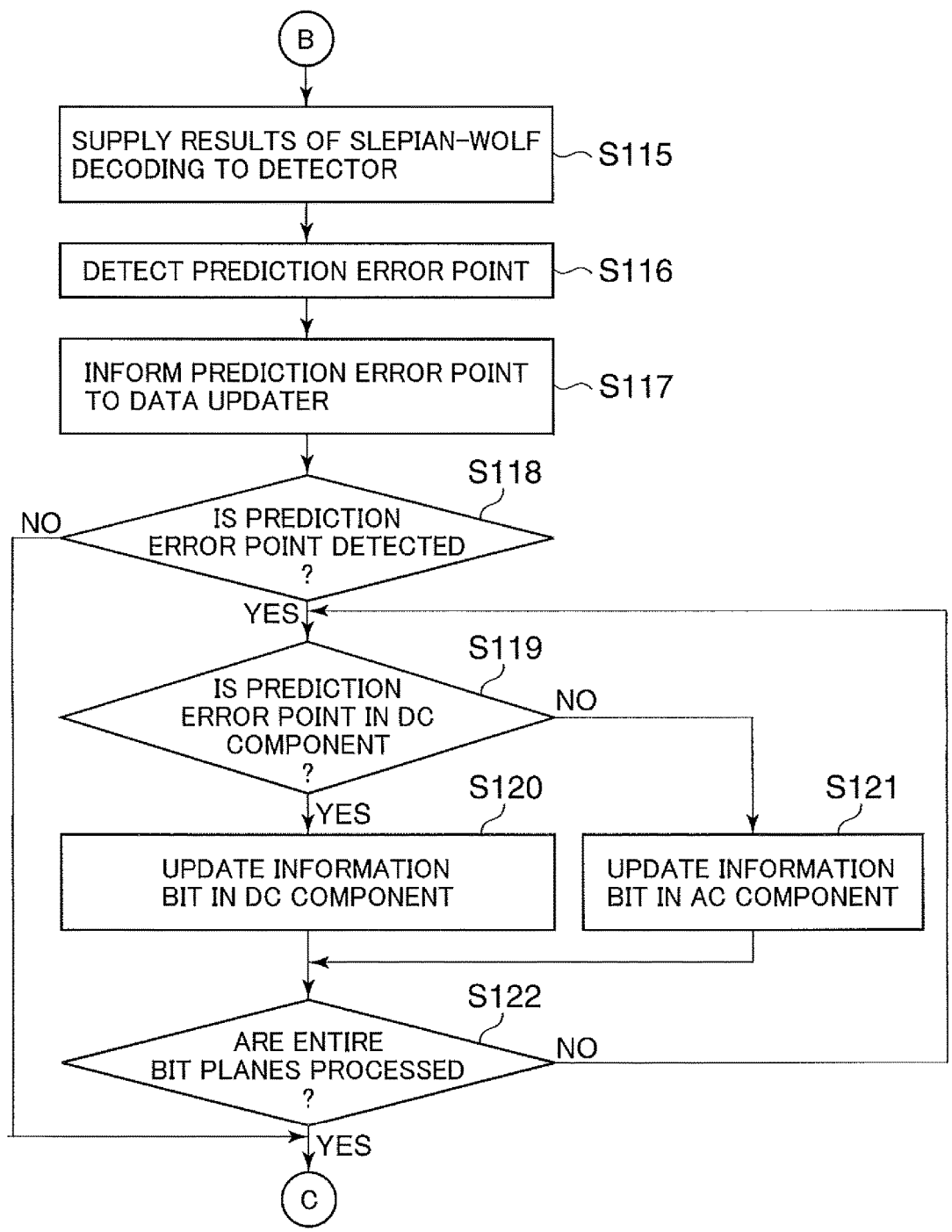

With reference to FIGS. 2, 3 and 4, which are flowcharts of decoding WZ frames in the motion video decoder 14, the operation of the motion video decoder 14 will be described. First, in the motion video decoder 14, encoded data of key frames are received by the key frame decoder 30 (S101, FIG. 2).

Next, the key frame decoder 30 decodes the received encoded data of key frames (S102), and then delivers the decoded key frame data to the buffer 32. The buffer 32 stores the decoded key frame data therein (S103).

From the buffer 32, the stored data of decoded key frames are read out to the side information generator 34 (S104).

Then, the side information generator 34 uses at least some of the data of decoded key frames stored in the buffer 32 to generate a predictive frame corresponding to each WZ frame. Then, the side information generator 34 transforms the predictive frames into a transform coefficient domain as side information (S105).

The predictive frames corresponding to the WZ frames may be generated by means of a prediction method, such as motion estimation and compensation. In that case, on the ground that the DVC scheme is advantageous in its decreased amount of calculation, it is preferable to apply a simpler method to generation of predictive frames.

The side information generator 34 in turn supplies the bit plane generator 38 with the side information thus generated by the side information generator 34, i.e. data obtained by transforming the predictive frames into the transform coefficient domain (S106).

Next, the bit plane generator 38 converts the side information to corresponding bit strings, and further groups the bit strings into bit planes, which will be described in detail later on (S107).

Then, through the subsequent loop process of steps, the bit planes generated by the bit plane generator 38 are supplied to the data updater 28 in sequence. When the detector 26 detects or identifies a prediction error point on a bit plane of interest, the data updater 28 updates that bit plane of interest, which will in turn be supplied to the Slepian-Wolf decoder 22.

More in detail, the bit plane generator 38 first supplies data of one bit plane to the data updater 28 (S108, FIG. 3).

Next, the data updater 28 determines whether or not the supplied bit plane to be processed is of the most significant bit (MSB). The determining process is shown in step S109 in FIG. 3. When the bit plane is determined to be of the most significant bit, the data updater 28 performs a process shown in the step S110. Otherwise, more specifically, when the bit plane is determined to be of the second significant bit, the data updater 28 performs a process shown in the step S115. In the following description and figures, a bit plane of the x-th significant bit may simply be referred to as "x-th bit plane" or "x-th significant bit plane", where x is a natural number.

If, in the step S109, the bit plane to be processed is determined to be of the most significant bit, then the data updater 28 supplies the Slepian-Wolf decoder 22 with the bit plane thus being processed (S110). In the process of the step S110, the Slepian-Wolf decoder 22 is also fed with the encoded data of WZ frames from the WZ frame encoder 18.

Then, the Slepian-Wolf decoder 22 uses the supplied bit plane to Slepian-Wolf-decode the encoded data of a WZ frame associated with the supplied bit plane (S111).

In a step S112, the Slepian-Wolf decoder 22 supplies the decoded image generator 24 with the decoding results from the process of the step S111.

Then, in a step S113, the data updater 28 determines whether or not the bit plane supplied to the Slepian-Wolf decoder 22 is of the least significant bit (LSB). It is to be noted that the entry to the above step S110 from a step S120, described below, means the bit plane supplied to the Slepian-Wolf decoder 22 is not of the most significant bit.

In the step S113, when the bit plane to be processed is not determined to be of the least significant bit, the motion video decoder 14 returns to the step S108 to proceed to the next bit plane. On the contrary, when the determination in the step S113 reveals that the bit plane to be processed is of the least significant bit, that means the one frame of interest has been processed. The decoded image generator 24 in turn uses the decoding results to produce a decoded video image (S114).

In the step S109, when the bit plane to be processed is not determined to be of the most significant bit, the data updater 28 makes the detector 26 hold the decoding results obtained by the Slepian-Wolf decoder 22 with respect to a bit plane or planes more significant than the bit plane being processed. Such a more significant bit plane may simply be referred to as "more significant bit plane". The above process is depicted as a step S115 in FIG. 4.

It may not be restrictive how the detector 26 gets the decoding results of the Slepian-Wolf decoder 22. For example, the detector 26 may be adapted to always keep the decoding results, outputted from the Slepian-Wolf decoder 22, stored therein. Alternatively, the detector 26 may be adapted to reference the contents stored in the decoded image generator 24, when necessary.

Then the control proceeds to a step S116, in which the detector 26 tries to detect or locate a prediction error point on the more significant bit planes generated by the bit plane generator 38. More specifically, the detector 26 determines whether or not and in which bit point a prediction error bit is included on the more significant bit plane. The detector 26 informs the data updater 28 of the results from the determination (S117). When the detector 26 detects plural prediction error points on the more significant bit plane, it notifies the data updater 28 of all of the prediction error points.

The detector 26 may be adapted, for example, to compare the bit plane for the predictive frame associated with a WZ frame outputted from the bit plane generator 38, i.e. bit plane included in the side information, with a bit plane for the decoded frame associated with a WZ frame and outputted from the Slepian-Wolf decoder 22 to thereby detect or locate on the bit plane a point which is different in value between the two bit planes. Such a point may be referred to as a prediction error point.

Then, through the loop process described below, the data updater 28 is responsive to the processing results informed from the detector 26 to review the contents of the bit plane being processed, and may update the bit plane if necessary. More specifically, the data updater 28 reviews such a point on the bit plane being processed that corresponds to the error point on the more significant bit planes informed from the detector 26, and may update the bit plane if necessary.

More in detail, the data updater 28 firstly checks the processing results informed from the detector 26 in the step S117 (S118). In the step S118, when the reported results contain information that one or more error points are detected on the more significant bit planes, the process progresses to a step S119, described below. On the contrary, when the reported results contain information that no error point is detected, the process returns to the step S110.

When the processing results checked in the step S118 contain information that one or more error points are detected on the more significant bit planes, the data updater 28 selects either one of the reported error points. Then, the data updater 28 checks whether the selected error point is of a direct current (DC) component or an alternate current (AC) component, the components being obtained by frequency transform (S119).

In turn, the data updater 28 uses different update rules, depending on whether the selected error point on the more significant bit planes is of the DC or AC component.

When the error point is of the DC component, the data updater 28 reviews information bit on the error point and updates the information bit according to a process in S120, if necessary. When the error point is in the AC component, the data updater 28 reviews the information bit corresponding to the error point, and may update the information bit according to the process in a step S121, if necessary. The process in the steps S120 and S121 will be described in detail later on.

When the bit plane to be processed has been updated in the step S120 or S121, the data updater 28 checks in a step S122 whether or not among the error point or points reported from the detector 26 there remains one or ones unprocessed by the step S120 or S121. If, in the step S122, the data updater 28 determines that at least one error point remains unprocessed, it selects either one of the unprocessed error point or points to progress to the step S119. In the step S122, when the data updater 28 determines that no unprocessed error point exists, that is, all of the error points have been updated, the update process has been finished on the entire bit planes to be processed, and the control returns to the step S110.

Next, it will be described in detail how the data updater 28 reviews and updates a bit plane to be processed, namely, the steps S120 and S121.

When a bit plane less significant than the most significant bit plane is to be processed, use is made of the processing results of a bit plane already processed and more significant than that. For instance, when the second most significant bit plane is to be processed, the processing results of the most significant bit plane are used. More in general, whenever the detector 26 proceeds to a bit plane of interest, and has detected any bit plane which has already been processed and is more significant than the bit plane of interest, it will review a bit corresponding to that prediction error point on the bit plane of interest. Depending on the result from such reviewing, the bit corresponding to a prediction error point may be updated, or remain unupdated to keep the same logical value.

For example, in an application in which frequency coefficients are quantized into three-bit code, if a prediction error point is determined to exist on the most significant bit plane, then the bits corresponding to that error point will be reviewed on the second significant bit plane and the least significant, i.e. third, bit plane when processed. For instance, if a prediction error point is detected on the most significant bit plane but no prediction error point is detected on the second significant bit plane, the least significant bit plane, when being processed, will then be reviewed as to the point corresponding to the prediction error point thus detected on the most significant bit plane. Also for example, if no prediction error point is detected on the most significant bit plane but a prediction error point is detected on the second significant bit plane, the least significant bit plane will be reviewed as to the corresponding point.

The data updater 28 may have a built-in storage adapted for storing information on a point to be reviewed and keeping the information stored until the WZ frame associated with that point has been processed.

As briefly stated above, the update rules are different depending on whether a component the detector 26 has determined as a prediction error point on a bit plane is a DC or AC component.

It will be described how the data updater 28 corrects a prediction error point in the step S120 when it is a DC component The update rule for DC components is based on a theory that "since the DC component substantially represents a pixel value, even an erroneous predictive point, or component, provides its correct value there around with higher probability." The update rule for DC components is that a quantized value is updated so as to approximate to original side information, i.e. original quantized value.

Figure 5:
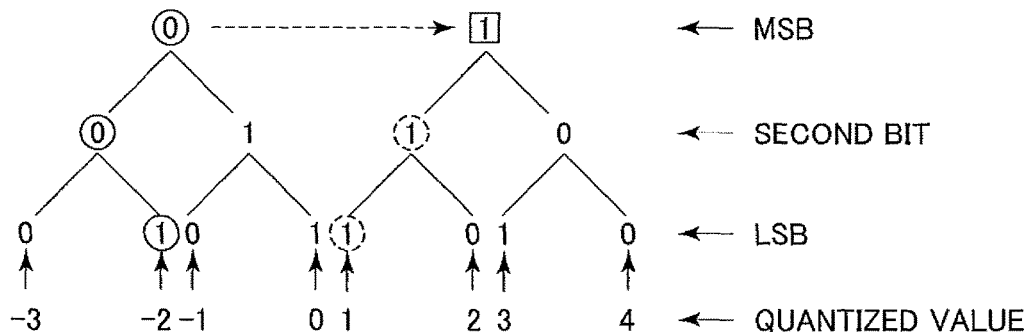
FIGS. 5 and 6 are schematic diagrams useful for understanding an update rule for a direct current (DC) component of side information in the motion video decoder shown in FIG. 1.
Figure 6:
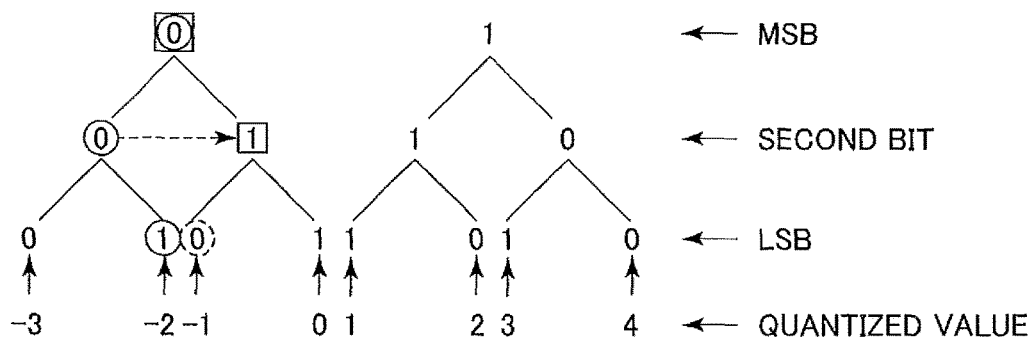

FIGS. 5 and 6 are schematic diagrams useful for understanding the update rule for DC components. FIGS. 5 and 6 show an exemplified case where the side information generator 34 transforms a generated predictive frame associated with a WZ frame into the transform coefficient domain, or frequency domain, and quantizes the data for each component in the frequency domain into three-bit code.

The three-bit code of a DC component is constituted, as shown in FIGS. 5 and 6, by the most significant bit (MSB), the second or less significant bit, and the least significant bit (LSB). The most significant bit of a DC component constitutes the most significant bit plane together with the most significant bits of AC components. Similarly, the second significant bit of the DC component constitutes a second significant bit plane together with the second significant bits of the AC components, and the least significant bit of the DC component constitutes the least significant bit plane together with the least significant bits of the AC components.

It is assumed, for example, that side information before updated represents a DC component that is quantized into a decimal value "−2", which is converted into a three-bit binary code "001" as shown in FIG. 5. In FIG. 5 and the subsequent figures, side information before updated is shown by circling the binary value of each bit.

It is also assumed that the detector 26 has estimated that the most significant bit "0" of the side information before updated is wrong on the ground that the most significant bit of the DC component obtained from the decoding results of a WZ frame is equal to binary "1", as shown in FIG. 5. In FIG. 5 and the subsequent figures, an original signal is shown by surrounding a correct bit value by a square.

Then, the data updater 28 reviews the DC component when processing the second significant bit plane and the least significant bit plane. Among three-bit codes having the most significant bit equal to binary "1", the code closest to binary value "001", corresponding to decimal value "−2", supplied from the bit plane generator 38 is binary value "111", that is, decimal "1".

The data updater 28 updates, when processing the second significant bit plane, the second significant bit of the DC component from binary "0" to "1". However, when processing the least significant bit plane, the data updater 28 continues to hold the least significant bit "1" of the DC component. In FIG. 5 and the subsequent figures, newly updated side information is shown by dashed-circling a corrected bit.

When the second significant bit plane is processed, the binary value of the least significant bit plane is not yet available. However, the second significant bit will be updated so as to approximate to original side information, i.e. original quantized value.

In another instance shown in FIG. 6, the detector 26 is assumed to estimate, on the basis of the decoding results of a WZ frame, that the second significant bit "0" of the side information before updated is incorrect while the detector 26 has already confirmed that the most significant bits "0" are consistent to each other.

In this case, the data updater 28 reviews the DC component when processing the least significant bit plane. Among three-bit codes having the most significant two bits equal to binary "01", the code closest to the side information of binary value "001", equivalent to decimal value "−2", before updated is binary value "010", that is, decimal "−1". When the data updater 28 processes the least significant bit plane, it updates the least significant bit of the DC component from binary "1" to "0" accordingly.

Next, it will be described how the data updater 28 corrects a prediction error point in a AC component in the step S121.

The update rule for AC components is based on a theory that "since an AC component has its signal values distributed around its median, i.e. zero, side information can be updated with higher probability by rendering a quantized value approximate to '0'". That is to say, the update rule for AC components is that a quantized value is updated so as to approximate to "0".

Figure 7:
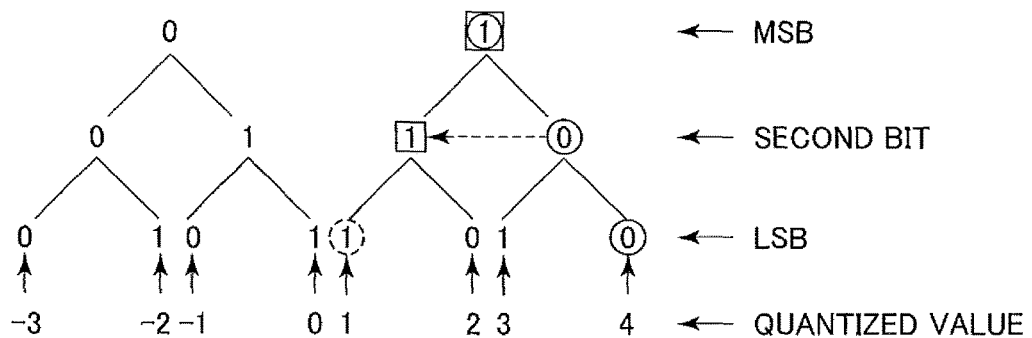
FIG. 7 is a schematic diagram useful for understanding an update rule for an alternate current (AC) component of side information in the motion video decoder shown in FIG. 1.

FIG. 7 is a schematic diagram useful for understanding the update rule for an AC component. FIG. 7 is directed also to the exemplified case where the side information generator 34 transforms a generated predictive frame associated with a WZ frame into the transform coefficient domain, or frequency domain, and quantizes the data for each component in the frequency domain into three-bit code.

It is assumed, for example, that side information before updated represents an AC component which is quantized into a decimal value "4", which is converted into a three-bit binary code "100" as shown in FIG. 7. It is further assumed that the detector 26 has estimated, on the basis of decoding results outputted from the Slepian-Wolf decoder 22, that the second significant bit "0" of the side information before updated is erroneous on the ground that the second significant bit of the AC component obtained from the decoding results of the WZ frame is equal to binary "1" while the detector 26 has already confirmed that the most significant bits "0" are consistent to each other.

When the data updater 28 processes the least significant bit plane, it reviews the AC component. Among three-bit codes having the most significant two bits equal to binary "11", a code having the quantized value closest to binary "0" is a binary code "111", equivalent to decimal value "1". When the data updater 28 processes the least significant bit plane, it updates the least significant bit of the AC component from binary "0" to "1" accordingly.

Each of FIGS. 5 to 7 can be said, from a different viewpoint, to also show a new correspondence table, or mapping table, for converting quantized values "−3" through "4" to three-bit codes "000" to "100", respectively.

However, a variety of conventional mapping codes can be applied. For example, an available conventional mapping table may be constituted by allocating binary zeros to all bits of the minimum quantized value and allocating binary ones to all bits of the maximum quantized value while the quantized values between the minimum and maximum quantized values are allocated to respective binary values which increment by binary one toward the larger one from the smaller one.

Another available conventional mapping table can be constituted by so-called Gray code, in which a quantized value is represented by a binary code of bits which have the same value between the binary codes of the quantized values incremented and decremented by one from the former binary code, except only one bit different in value.

Figure 8:
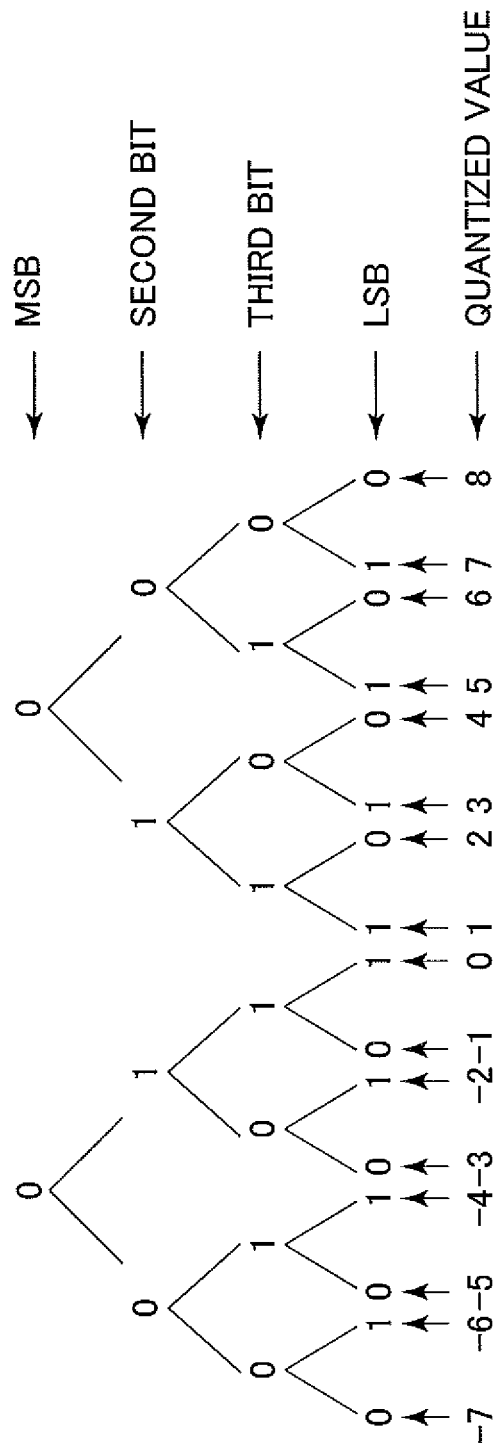
FIG. 8 is a schematic diagram showing a mapping table in case of converting a quantized value into a four-bit code in the motion video decoder in the embodiment.

In the instant illustrative embodiment, the mapping table contains quantized values in the form of three-bit code such that the quantized value closer to decimal "0" the more bit positions having binary value "1", and that, among the three-bit codes containing the same number of bit positions having binary value "1", the three-bit code having its quantized value closer to decimal zero the more significant bit position having binary value "1". FIG. 8 schematically shows a mapping table formed in line with the above concept for use in converting quantized values to corresponding four-bit code.

As is clear from FIGS. 5 and 8, for in converting quantized values to three- and four-bit code, respectively, the mapping tables can be constituted on the basis of the above concept. Although not shown, also in order to convert quantized values to five- or more-bit code, mapping tables can of course be constituted on the basis of the aforementioned concept.

The mapping table in the illustrative embodiment is considered on the basis of such an update rule for AC components of side information that quantized values are updated so as to approximate to decimal "0". It is to be noted that a predictive frame for a WZ frame is transformed into a transform coefficient domain to thereby produce a single DC component and plural AC components. It is therefore important to take account of the update rule for AC components.

Figure 9A:
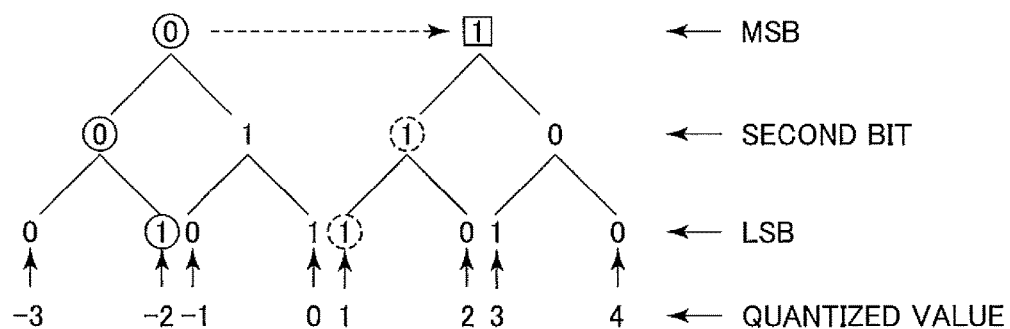
FIGS. 9A and 9B are also schematic diagrams useful for understanding an update rule for the AC component of side information in the motion video decoder shown in FIG. 1.
Figure 9B:
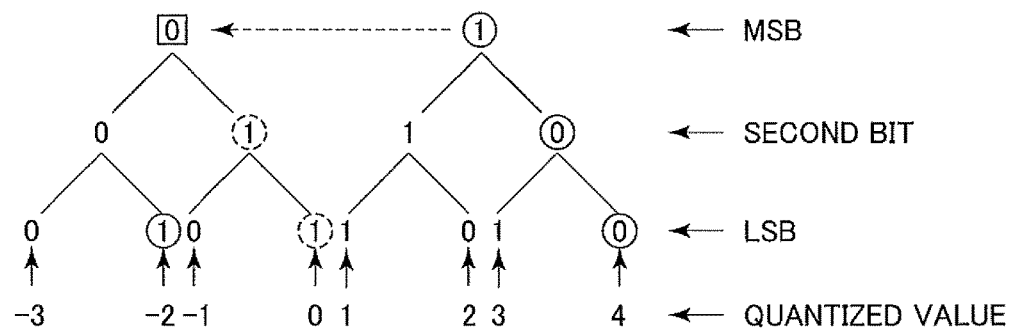

With reference to FIGS. 9A and 9B, it will be described how advantageously the mapping tables of the illustrative embodiment may be applied. FIG. 9A shows an exemplified case where side information of AC components generated first is represented by a quantized value of decimal "−2", which is equivalent to three-bit code "001", and where the detector 26 has detected that the most significant bit is correctly binary "1". In this case, it is necessary to update the side information to a quantized value which is closest to decimal zero among quantized values represented by three-bit code having the most significant bit equal to binary "1". Among three-bit codes having the most significant bit equal to binary "1", the quantized value closest to decimal zero is represented by three-bit code "111". This means that all the bits other than the most significant bit found erroneous may be updated to binary "1".

FIG. 9B shows an exemplified case where side information of AC components first generated is represented by a quantized value of decimal "4", or three-bit code "100", and where the detector 26 has detected that the most significant bit is correctly binary "0". In this case, it is necessary to update the side information to a quantized value which is closest to decimal zero among quantized values represented by three-bit code having the most significant bit equal to binary "0". Among three-bit codes having the most significant bit equal to binary "0", the quantized value closest to decimal zero is represented by three-bit code "011". Therefore, all the bits other than the most significant bit found erroneous may be updated to binary "1". Also in a case where an error is first found in a less significant bit than the most significant bit, side information can be updated by setting all the less significant bit or bits than the bit found erroneous to binary "1".

By means of the mapping tables thus structured, when side information contains a prediction error in a bit, all the bits less significant than the erroneous bit can be updated to binary "1", which allows a less significant bit or bits to be readily updated.

Instead of the mapping tables shown in FIGS. 5, 6, 7 and 9, a mapping table may be applied which is the same as the mapping tables shown in those figures except for the values "1" and "0" of the most significant bit reversed to binary values "0" and "1", respectively. That is to say, to the most significant bit binary values "0" and "1" can be arbitrarily allotted. In this case, when side information contains a prediction error in a bit, all the bits less significant than the erroneous bit may be updated to binary "1", which also advantageously allows a less significant bit or bits to be readily updated.

Alternatively, instead of the mapping tables shown in FIGS. 5, 6, 7 and 9, a mapping table may be applied which corresponds to those mapping tables such as to have all the bit values "1" and "0" replaced with respectively opposite values "0" and "1". In this case, when side information contains a prediction error in a bit, all the less significant bits than the erroneous bit may be updated to binary "0", which also advantageously permits a less significant bit or bits to be readily updated.

In accordance with the illustrative embodiment described above, the data updater 28 is provided to update each bit plane of side information generated in the side information generator 34, depending on whether to match the decoding results of a more significant bit plane obtained precedently, to supply the updated side information to the Slepian-Wolf decoder 22. The motion video decoder 14 can update generated side information, without using an extra mechanism, such as motion detection and compensation, requiring a large amount of processing for generating side information. Eventually, without significant increase in amount of processing, the compression ratio and the quality of decoded images can advantageously be improved.

The processing performed by the data updater 28 is so simple that the quantized value of a DC component is updated so as to approximate to its original quantized value and the quantized values of AC components are updated so as to approximate to zero. Therefore, the implementation by software can reduce the number of steps. Likewise, the implementation by hardware can also reduce the scale of the circuitry. Particularly, mapping tables as employed in the above-described embodiment are significantly advantageous in simplifying the processing steps.

The present invention is not to be restricted by the above illustrative embodiment. Alternative embodiments will briefly be described.

The preceding embodiment shown in and described with reference to FIG. 1 employs MAP decoding such as the Bahl, Cocke, Jelinek and Raviv (BCJR) algorithm as a Slepian-Wolf coding scheme. However, the coding scheme usable for the present invention is not to be restricted to such MAP decoding. For example, the present invention can be implemented by any types of coding algorithm, such as log-MAP algorithm and max-log-MAP algorithm, having a plurality of states at a time and having a calculation path or paths linking the states.

The above embodiment also employs Turbo code and low-density parity-check (LDPC) code as a Slepian-Wolf coding. However, it is evident that other error correction codes may be used.

In the above embodiment, the side information generator 34 is operative to use a decoded frame or frames immediately preceding or/and following a WZ frame to detect motion between frames. However, the present invention is not to be restricted by such examples. For motion detection, any frames stored in the buffer 32 may be used. Alternatively, without detecting motion, a decoded frame immediately preceding a frame of interest may be used as side information.

The communication channel 16 between the motion video decoder 14 and the motion video encoder 12 in the above embodiment may not be restricted to a narrowly-defined communication channel but may be a broadly-defined communication channel. For example, the communication channel 16 may be implemented in the form of not only real-time communications but also storage or delaying system in which, for example, data encoded by the motion video encoder 12 are recorded on a record medium, from which the motion video decoder 14 reads out the stored data for processing.

The above embodiment is adapted for transforming a predictive frame associated with a WZ frame and an original frame into the transform coefficient domain, or frequency domain. However, the technical concept of the present invention can also be applied to processing data of images in the pixel domain without being transformed to the frequency domain. For example, processed pixel values are quantized, and then transformed into bit string code in a predetermined format, which is arranged into bit planes for further processing. In this case, the data updater 28 may be adapted to operate under an update rule relying upon, for example, the concept that "when a predictive frame is erroneous, the correct value may reside around the erroneous predictive frame with higher probability" to thereby update the data so as to approximate to the original side information, i.e. original quantized value.

The entire disclosure of Japanese patent application No. 2010-264011 filed on Nov. 26, 2010, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A data updating apparatus updating first side information including a plurality of first bit planes according to a predetermined data format, comprising:
    a detector configured to detect a domain point at which the first side information are different from second side information including a plurality of second bit planes previously decoded by Slepian-Wolf decoding according to the predetermined data format, the first side information being used for decoding encoded data on a non-key frame separated from a stream of frames by the Slepian-Wolf decoding and transformed from a predictive frame associated with the non-key frame and generated from information on a key frame; and
    a data updater configured to update a less significant bit in the first side information than a bit corresponding to the domain point supplied from said detector according to a predetermined updating scheme based on said detector detecting the domain point,
    wherein the data updating apparatus is disposed in an apparatus that receives video information via a communication channel from a video information source,
    wherein the first side information is obtained by transforming the predictive frame associated with the non-key frame into a frequency domain, quantizing each frequency component into a quantized value, and converting the quantized value to a code of the plurality of first bit planes,
    said data updater applies appropriate one of different updating schemes, depending on whether the frequency component converted to the code of the plurality of first bit planes is a direct current component or an alternate current component, to update the first side information, and
    with respect to the direct current component in the first side information, said data updater replaces a most significant bit among bits different from the second side information with a bit value of a corresponding bit position in the second side information, and updates a less significant bit than the replaced bit so as to set the first side information after updating to the quantized value closest to the first side information before updating.

2. The apparatus in accordance with claim 1, wherein with respect to the alternate current component in the first side information, said data updater replaces a most significant bit among bit different from the second side information with a bit value of a corresponding bit position in the second side information, and updates a less significant bit than the replaced bit so as to set a quantized value represented by the first side information after updating to a quantized value closest to zero.

3. The apparatus in accordance with claim 1, wherein in the first and the second side information including the code of the plurality of bit planes converted from the quantized value, either one of a first and a second bit value is arbitrarily allotted depending on the quantized value in a most significant bit, and in bits subsequent to the most significant bit, a quantized value closer to zero has more bits taking the first bit value, and, among the quantized values having a same number of bits taking the first bit value, a quantized value closer to zero has a more significant bit position taking the first bit value.

4. A motion video decoder comprising:
    a key frame decoder decoding encoded data on a key frame separated from a stream of frames;
    a transformer producing from information on the key frame a predictive frame associated with a non-key frame separated from the stream of frames, and then transforming the predictive frame into first side information including a plurality of first bit planes according to a predetermined data format;
    a Slepian-Wolf decoder using the first side information to decode encoded data on the non-key frame by Slepian-Wolf-decoding; and
    an updating apparatus updating the first side information to supply said Slepian-Wolf decoder with updated side information,
    wherein said updating apparatus comprises:
        a detector detecting a domain point at which the first side information is different from second side information including a plurality of second bit planes previously decoded by the Slepian-Wolf decoding according to the predetermined data format; and
        a data updater updating a less significant bit in the first side information than the domain point supplied from said detector according to a predetermined updating scheme when said detector detects the domain point,
    wherein the motion video decoder is disposed in an apparatus that receives video information via a communication channel from a video information source, and
    wherein the first side information is obtained by transforming the predictive frame associated with the non-key frame into a frequency domain, quantizing each frequency component into a quantized value, and converting the quantized value to a code of the plurality of first bit planes, and
    wherein said data updater applies an appropriate one of different updating schemes, depending on whether the frequency component converted to the code of the plurality of first bit planes is a direct current component or an alternate current component to update the first side information, and
    in the first and the second side information including the code of the plurality of bit planes converted from the quantized value, either one of a first and a second significant bit value is arbitrarily allotted depending on the quantized value in a most significant bit, and in bits subsequent to the most significant bit, a quantized value closer to zero has more bits taking the first bit value, and, among the quantized values having a same number of bits taking the first bit value, a quantized value closer to zero has a more significant bit position taking the first bit value.

5. The motion video decoder in accordance with claim 4, wherein with respect to the direct current component in the first side information, said data updater replaces a most significant bit among bits different from the second side information with a bit value of a corresponding bit position in the second side information, and updates a less significant bit than the replaced bit so as to set the first side information after updating to the quantized value closest to the first side information before updating.

6. The motion video decoder in accordance with claim 4, wherein with respect to the alternate current component in the first side information, said data updater replaces a most significant bit among bits different from the second side information with a bit value of a corresponding bit position in the second side information, and updates a less significant bit than the replaced bit so as to set a quantized value represented by the first side information after updating to a quantized value closest to zero.

7. A motion video delivery system comprising:
    a motion video encoder encoding motion video into encoded data, the motion video encoder being disposed at a video information source; and
    a motion video decoder to decode the encoded data, the motion video decoder being disposed in a video receiving apparatus that receives video information via a communication channel from the video information source,
    wherein said motion video decoder comprises:
        a key frame decoder decoding encoded data on a key frame separated from a stream of frames,
        a transformer producing from information on the key frame a predictive frame associated with a non-key frame separated from the stream of frames, and then transforming the predictive frame into first side information including a plurality of first bit planes according to a predetermined data format,
        a Slepian-Wolf decoder using the first side information to decode the encoded data on the non-key frame by Slepian-Wolf decoding, and
        an updating apparatus updating the first side information to supply said Slepian-Wolf decoder with updated first side information,
    wherein said updating apparatus comprises:
        a detector detecting a domain point at which the first side information are different from second side information including a plurality of second bit planes previously decoded by the Slepian-Wolf decoding according to the predetermined data format; and
        a data updater updating a less significant bit in the first side information than the domain point supplied from said detector according to a predetermined updating scheme when said detector detects the domain point,
    wherein the first side information is obtained by transforming the predictive frame associated with the non-key frame into a frequency domain, quantizing each frequency component into a quantized value, and converting the quantized value to a code of the plurality of first pit planes,
    wherein said data updater applies an appropriate one of different updating schemes, depending on whether the frequency component converted to the code of the plurality of first pit planes is a direct current component or an alternate current component to update the first side information, and
    with respect to the direct current component in the first side information, said data updater replaces a most significant bit among bits different from the second side information with a bit value of a corresponding bit position in the second side information, and updates a less significant bit than the replaced bit so as to set the first side information after updating to the quantized value closest to the first side information before updating.

8. The delivery system in accordance with claim 7, wherein with respect to the alternate current component in the first side information, said data updater replaces a most significant bit among bits different from the second side information with a bit value of a corresponding bit position in the second side information, and updates a less significant bit than the replaced bit so as to set a quantized value represented by the first side information after updating to a quantized value closest to zero.

9. The delivery system in accordance with claim 7, wherein
    in the first and the second side information including the code of the plurality of bit planes converted from the quantized value,
        either one of a first and a second significant bit value is arbitrarily allotted depending on the quantized value in a most significant bit,
        in bits subsequent to the most significant bit, a quantized value closer to zero has more bits taking the first bit value, and, among the quantized values having a same number of bits taking the first bit value, a quantized value closer to zero has a more significant position taking the first bit value.

10. A non-transitory computer-readable medium having a computer program recorded therein, said computer program controlling the computer, when installed and run, to function as a data updating apparatus which updates first side information including a plurality of first bit planes according to a predetermined data format by:
    detecting a domain point at which the first side information is different from second side information including a plurality of bits decoded by a Slepian-Wolf decoding according to the predetermined data format, the first side information being used for decoding encoded data on a non-key frame separated from a stream of frames by the Slepian-Wolf decoding and transformed from a predictive frame associated with the non-key frame and generated from information on a key frame;
    updating a less significant bit in the first side information than the domain point according to a predetermined updating scheme when said detector detects the domain point; and
    with respect to the direct current component in the first side information, updating the less significant bit in the first side information than the domain point according to the predetermined updating scheme includes updating a most significant bit among bits different from the second side information with a bit value of a corresponding bit position in the second side information, and updating a less significant bit than the replaced bit so as to set the first side information after updating to the quantized value closest to the first side information before updating,
    wherein the domain point is detected in an apparatus that receives a video information via a communication channel from a video information source,
    wherein the first side information is obtained by transforming the predictive frame associated with the non-key frame into a frequency domain, quantizing each frequency component into a quantized value, and converting the quantized value to a code of the plurality of first bit planes, and
    wherein updating the less significant bit in the first side information than the domain point according to the predetermined updating scheme includes applying an appropriate one of different updating schemes, depending on whether the frequency component converted to the code of the plurality of first bit planes is a direct current component or an alternate current component.

11. The apparatus in accordance with claim 1, further comprising a side information generating system and a bit plane generator that generate the first bit plane of the first side information, wherein the detector receives the bit plane data of site information and detects a prediction error point of the side information for each bit plane in between the first and the second side information.

12. The apparatus in accordance with claim 11, wherein the data updater updates respective bits of the first bit planes transformed from the first side information by the bit plane generator.

13. The decoder in accordance with claim 4, further comprising a side information generating system and a bit plane generator that generate the first bit plane of the first side information, wherein the detector receives the bit plane data of site information and detects a prediction error point of the side information for each bit plane in between the first and the second side information.

14. The decoder in accordance with claim 13, wherein the data updater updates respective bits of the first bit planes transformed from the first side information by the bit plane generator.

* * * * *